United States Patent
Akatsuka et al.

(10) Patent No.: US 12,377,905 B2
(45) Date of Patent: Aug. 5, 2025

(54) STEERING SYSTEM AND CONTROL METHOD FOR STEERING SYSTEM

(71) Applicants: TOYOTA JIDOSHA KABUSHIKI KAISHA, Toyota (JP); JTEKT Corporation, Kariya (JP)

(72) Inventors: Kosuke Akatsuka, Susono (JP); Yoshio Kudo, Machida (JP); Rio Suda, Toyota (JP); Isao Namikawa, Okazaki (JP); Takashi Kodera, Okazaki (JP)

(73) Assignees: TOYOTA JIDOSHA KABUSHIKI KAISHA, Toyota (JP); JTEKT CORPORATION, Kariya (JP)

( * ) Notice: Subject to any disclaimer, the term of this patent is extended or adjusted under 35 U.S.C. 154(b) by 748 days.

(21) Appl. No.: 17/538,072

(22) Filed: Nov. 30, 2021

(65) Prior Publication Data
US 2022/0227412 A1 Jul. 21, 2022

(30) Foreign Application Priority Data

Jan. 20, 2021 (JP) .................................. 2021-007249
Apr. 12, 2021 (JP) .................................. 2021-067039

(51) Int. Cl.
- B62D 5/00 (2006.01)
- B62D 5/04 (2006.01)
- B62D 6/00 (2006.01)

(52) U.S. Cl.
CPC ............ B62D 5/006 (2013.01); B62D 5/0463 (2013.01); B62D 5/0469 (2013.01); B62D 6/008 (2013.01)

(58) Field of Classification Search
CPC .... B62D 5/006; B62D 5/0463; B62D 5/0469; B62D 6/008; B62D 15/0265; B62D 1/286; B62D 15/025; B62D 5/04; B62D 6/00

USPC .......................................................... 180/446
See application file for complete search history.

(56) References Cited

U.S. PATENT DOCUMENTS

| | | | |
|---|---|---|---|
| 2019/0084581 A1* | 3/2019 | Miura ................... | B60W 50/00 |
| 2021/0387669 A1* | 12/2021 | Sakaguchi ......... | B62D 15/0215 |
| 2021/0394828 A1* | 12/2021 | Audino ............... | B62D 15/025 |
| 2022/0227416 A1 | 7/2022 | Suzuki | |

FOREIGN PATENT DOCUMENTS

| | | |
|---|---|---|
| JP | 2016-159781 A | 9/2016 |
| JP | 6451674 B2 | 1/2019 |
| WO | 2020/230307 A1 | 11/2020 |

\* cited by examiner

*Primary Examiner* — Scott A Reinbold
(74) *Attorney, Agent, or Firm* — Dinsmore & Shohl LLP

(57) ABSTRACT

In a steering system including a steering operation mechanism, a second actuator, a steering angle sensor, a steering torque sensor, and a steering operation control device and a control method for the steering system, only a drive assist target steered angle (first target steered angle) is reflected in a final target steered angle when a torque sensor value (actual steering torque) detected by the steering torque sensor is equal to or less than an intervention threshold. When the magnitude of the torque sensor value is more than the intervention threshold, the rate of reflection (distribution ratio) of a driver target steered angle (second target steered angle) in the final target steered angle is raised as the torque sensor value is increased, and the rate of reflection of the driver target steered angle in the final target steered angle is lowered as the magnitude of the torque sensor value is decreased.

3 Claims, 10 Drawing Sheets

STEERING SYSTEM AND CONTROL METHOD FOR STEERING SYSTEM

CROSS-REFERENCE TO RELATED APPLICATION

This application claims priority to Japanese Patent Application No. 2021-007249 filed on Jan. 20, 2021 and Japanese Patent Application No. 2021-067039 filed on Apr. 12, 2021, each incorporated herein by reference in its entirety.

BACKGROUND

1. Technical Field

The present disclosure relates to a steer-by-wire steering system and a control method for the steering system.

2. Description of Related Art

There is known a drive assist device that assists a driver in driving a vehicle as disclosed in Japanese Patent No. 6451674, for example. In the drive assist device, while drive assist is performed, intervention in an operation by the driver is performed occasionally. In the related art described in Japanese Patent No. 6451674, drive assist is stopped and switching is made to manual drive when an operation force with which the driver operates a steering wheel has become more than a threshold during drive assist.

Application of the drive assist device described above to a steer-by-wire steering system has been discussed recently. In the steer-by-wire steering system, a steering wheel and a steering operation mechanism are mechanically decoupled from each other. Therefore, the drive assist device can achieve intended steered angle control, without being affected by an operation of the steering wheel not intended by the driver, by controlling a steering operation actuator in accordance with a signal from the drive assist device.

However, intervention in steered angle control by the driver performed while drive assist is performed is not necessarily irrelevant to the intention of the driver, but is occasionally based on the intention of the driver. If intentional intervention in steered angle control attempted by the driver is refused, the driver may have a bad impression. If intervention in steered angle control not intended by the driver is allowed, however, sufficient drive assist may not be provided to the driver. Hence, it is considered to be an important issue how to allow intervention in steered angle control by the driver and how to refuse such intervention when steered angle control by the drive assist device is performed for a steer-by-wire steering system and a control method for the steering system.

SUMMARY

The present disclosure has been made in view of the foregoing issue, and provides a steer-by-wire steering system and a control method for the steering system that allow a steering operation intended by a driver to be reflected in steered angle control while suppressing reflection of a steering operation not intended by the driver in the steered angle control when steered angle control is performed through drive assist.

A first aspect of the present disclosure relates to a steering system including a steering operation mechanism, a second actuator, a steering angle sensor, a steering torque sensor, and a steering operation control device. The steering operation mechanism is mechanically decoupled from a steering wheel, and configured to steer steered wheels using a first actuator. The second actuator is configured to rotate the steering wheel via a steering shaft. The steering angle sensor is configured to detect a steering angle of the steering wheel. The steering torque sensor is configured to detect steering torque that acts on the steering shaft. The steering operation control device is configured to control a steered angle using a steered angle command value to be provided to the first actuator.

The steering operation control device executes each of at least the following first to sixth processes. The first process is a process of receiving a first target steered angle for drive assist from outside the steering operation control device. The second process is a process of driving the second actuator in accordance with a steering angle command value obtained by converting the first target steered angle into a steering angle. The third process is a process of computing a second target steered angle obtained by converting an actual steering angle detected by the steering angle sensor into a steered angle. The fourth process is a process of reflecting only the first target steered angle in a final target steered angle when a magnitude of actual steering torque detected by the steering torque sensor is equal to or less than a threshold, and reflecting at least the second target steered angle in the final target steered angle when the magnitude of the actual steering torque is more than the threshold. The fifth process is a process of determining the steered angle command value based on the final target steered angle. The sixth process is a process of varying a magnitude of the threshold in accordance with whether a steered wheel operation by the drive assist is gentle or abrupt.

A second aspect of the present disclosure relates to a control method for a steering system including a steering operation mechanism, a second actuator, a steering angle sensor, a steering torque sensor, and a steering operation control device. The steering operation mechanism is mechanically decoupled from a steering wheel, and configured to steer steered wheels using a first actuator. The second actuator is configured to rotate the steering wheel via a steering shaft. The steering angle sensor is configured to detect a steering angle of the steering wheel. The steering torque sensor is configured to detect steering torque that acts on the steering shaft. The steering operation control device is configured to control a steered angle using a steered angle command value to be provided to the first actuator.

The control method for the steering system includes the following controls (i) to (vi): (i) receiving a first target steered angle for drive assist from outside the steering operation control device; (ii) driving the second actuator in accordance with a steering angle command value obtained by converting the first target steered angle into a steering angle; (iii) computing a second target steered angle obtained by converting an actual steering angle detected by the steering angle sensor into a steered angle; (iv) reflecting only the first target steered angle in a final target steered angle when a magnitude of actual steering torque detected by the steering torque sensor is equal to or less than a threshold, and reflecting at least the second target steered angle in the final target steered angle when the magnitude of the actual steering torque is more than the threshold; (v) determining the steered angle command value based on the final target steered angle; and (vi) varying a magnitude of the threshold in accordance with whether a steered wheel operation by the drive assist is gentle or abrupt.

With the steering system according to the first aspect and the control method for a steering system according to the second aspect, the following functions and effects can be obtained.

When the driver is not operating the steering wheel, for example when the driver just places his/her hands on the steering wheel, rotation of the steering wheel by the second actuator is not hindered. Therefore, the second target steered angle which is obtained from the actual steering angle of the steering wheel which is detected by the steering angle sensor is generally equal to the first target steered angle, on which a steering angle command value for driving the second actuator is based. In this case, in addition, steering torque does not act on the steering shaft, or even if it does, only significantly small steering torque acts on the steering shaft. When the magnitude of steering torque is equal to or less than the threshold, only the first target steered angle is reflected in the final target steered angle, and thus steering operation control for drive assist is performed.

Even when the driver makes input to the steering wheel, if the difference between the steering angle of the steering wheel and the rotational angle of the steering shaft due to the second actuator is small, steering torque that acts on the steering shaft is also small. Steering torque that acts on the steering shaft acts as a reaction force for the driver. If the driver attempts to intentionally intervene in steered angle control, the driver operates the steering wheel so as to overcome the reaction force, and as a result larger steering torque is generated. Hence, even when a steering operation is performed by the driver, the steering operation is considered to be not intended by the driver if actual steering torque detected along with the steering operation is not large. If the detected actual steering torque is not more than the threshold, only the first target steered angle for drive assist is reflected in the final target steered angle. That is, reflection of a steering operation not intended by the driver in steered angle control is suppressed.

When the driver makes large input to the steering wheel and the difference between the steering angle of the steering wheel and the rotational angle of the steering shaft due to the second actuator becomes large, steering torque that acts on the steering shaft also becomes large. There is a higher possibility that the driver is performing an intentional steering operation as the magnitude of generated steering torque is larger. When the detected actual steering torque is more than the threshold, the second target steered angle is reflected in the final target steered angle. The second target steered angle which is calculated from the steering angle which is detected by the steering angle sensor means a target steered angle requested by the driver. A steering operation intended by the driver is reflected in the steered wheel operation when the second target steered angle is reflected in the final target steered angle.

In drive assist, whether a steered wheel operation is gentle or abrupt is varied in accordance with the role or function of the drive assist. Whether a steered wheel operation due to drive assist is gentle or abrupt manifests itself in the first target steered angle, and thus a drive force that acts on the steering shaft from the second actuator is varied in accordance with whether a steered wheel operation due to drive assist is gentle or abrupt. When the steering shaft is driven by the second actuator, a reaction force acts on the driver from the steering wheel even if the driver just places his/her hands on the steering wheel, for example. The reaction force which acts on the driver is larger as the drive force which acts on the steering shaft is larger. As a result, large steering torque is occasionally generated in accordance with whether a steered wheel operation due to drive assist is gentle or abrupt, even when not intended by the driver.

In the steering system according to the first aspect and the control method for a steering system according to the second aspect, the threshold for steering torque, which is a criterion for determination as to whether only the first target steered angle is reflected in the final target steered angle or at least the second target steered angle is reflected in the final target steered angle, is varied in accordance with whether a steered wheel operation due to drive assist is gentle or abrupt. With the threshold for steering torque varied in accordance with whether a steered wheel operation due to drive assist is gentle or abrupt in this manner, it is possible to suppress a steering operation not intended by the driver being reflected in steered angle control in situations in which drive assist with different roles or functions is performed. With the threshold for steering torque varied in accordance with whether a steered wheel operation due to drive assist is gentle or abrupt, in addition, it is possible to allow a steering operation intended by the driver to be reflected in steered angle control in situations in which drive assist with different roles or functions is performed.

In the steering system according to the first aspect, the steering operation control device may be configured to vary the magnitude of the threshold in accordance with a mode of the drive assist. For example, when the drive assist mode is a mode in which an abrupt steered wheel operation is performed, the steering operation control device may make the threshold large compared to a mode in which a gentle steered wheel operation is performed. With the steering system configured as described above, it is possible to appropriately handle sudden, abrupt variations in steering torque by varying the threshold in accordance with the drive assist mode.

In the steering system according to the first aspect, in addition, the steering operation control device may be configured to reflect the second target steered angle in the final target steered angle in accordance with the magnitude of the steering torque when the magnitude of the steering torque is more than the threshold. Particularly, the steering operation control device may be configured to raise a rate of reflection of the second target steered angle in the final target steered angle as the magnitude of the steering torque is increased, and lower the rate of reflection as the magnitude of the steering torque is decreased. With the steering system configured as described above, switching from steering operation control based on the first target steered angle to steering operation control based on the second target steered angle can be made continuously, and abrupt variations in the behavior of the vehicle can be suppressed when the switching is made. Consequently, in addition, the steering angle of the steering wheel is reflected in the steered angle in accordance with steering torque applied to the steering wheel by the driver. Therefore, when the driver intentionally performs a steering operation, the vehicle can be caused to behave as intended in accordance with the degree of the steering operation.

A third aspect of the present disclosure relates to a steering system including a steering operation mechanism, a second actuator, a steering angle sensor, a steering torque sensor, and a steering operation control device. The steering operation mechanism is mechanically decoupled from a steering wheel, and configured to steer steered wheels using a first actuator. The second actuator is configured to rotate the steering wheel via a steering shaft. The steering angle sensor is configured to detect a steering angle of the steering wheel. The steering torque sensor is configured to detect steering torque that acts on the steering shaft. The steering operation control device is configured to control a steered angle using a steered angle command value to be provided to the first actuator.

The steering operation control device executes each of at least the following first to fifth processes. The first process is a process of receiving a first target steered angle for drive assist from outside the steering operation control device. The second process is a process of driving the second actuator in accordance with a steering angle command value obtained by converting the first target steered angle into a steering angle. The third process is a process of computing a second target steered angle obtained by converting an actual steering angle detected by the steering angle sensor into a steered angle. The fourth process is a process of reflecting only the first target steered angle in a final target steered angle when a magnitude of actual steering torque detected by the steering torque sensor is equal to or less than a threshold, and reflecting the second target steered angle in the final target steered angle in accordance with an increase in the magnitude of the actual steering torque when the magnitude of the actual steering torque is more than the threshold. Particularly, the fourth process is a process of raising a rate of reflection of the second target steered angle in the final target steered angle as the magnitude of the actual steering torque is increased, and lowering the rate of reflection as the magnitude of the actual steering torque is decreased, when the magnitude of the actual steering torque is more than the threshold. The fifth process is a process of varying a magnitude of the threshold in accordance with whether a steered wheel operation by the drive assist is gentle or abrupt.

A fourth aspect of the present disclosure relates to a control method for a steering system including a steering operation mechanism, a second actuator, a steering angle sensor, a steering torque sensor, and a steering operation control device. The steering operation mechanism is mechanically decoupled from a steering wheel, and configured to steer steered wheels using a first actuator. The second actuator is configured to rotate the steering wheel via a steering shaft. The steering angle sensor is configured to detect a steering angle of the steering wheel. The steering torque sensor is configured to detect steering torque that acts on the steering shaft. The steering operation control device is configured to control a steered angle using a steered angle command value to be provided to the first actuator.

The control method for the steering system includes the following controls (i) to (v): (i) receiving a first target steered angle for drive assist from outside the steering operation control device; (ii) driving the second actuator in accordance with a steering angle command value obtained by converting the first target steered angle into a steering angle; (iii) computing a second target steered angle obtained by converting an actual steering angle detected by the steering angle sensor into a steered angle; (iv) reflecting only the first target steered angle in a final target steered angle when a magnitude of actual steering torque detected by the steering torque sensor is equal to or less than a threshold, and reflecting the second target steered angle in the final target steered angle in accordance with an increase in the magnitude of the actual steering torque when the magnitude of the actual steering torque is more than the threshold. Particularly, raising a rate of reflection of the second target steered angle in the final target steered angle as the magnitude of the actual steering torque is increased, and lowering the rate of reflection as the magnitude of the actual steering torque is decreased, when the magnitude of the actual steering torque is more than the threshold; and (v) varying a magnitude of the threshold in accordance with whether a steered wheel operation by the drive assist is gentle or abrupt.

With the steering system according to the third aspect and the control method for a steering system according to the fourth aspect, the following functions and effects can be obtained.

Also in the steering system according to the third aspect and the control method for a steering system according to the fourth aspect, as in the steering system according to the first aspect and the control method for a steering system according to the second aspect, a steering operation by the driver is considered to be not intended by the driver if actual steering torque detected along with the steering operation is not large. With the steering system according to the second aspect, only the first target steered angle for drive assist is reflected in the final target steered angle if the detected actual steering torque is not more than the threshold, and thus it is possible to suppress a steering operation not intended by the driver being reflected in steered angle control.

In addition, also in the steering system according to the third aspect and the control method for a steering system according to the fourth aspect, as in the steering system according to the first aspect and the control method for a steering system according to the second aspect, there is a higher possibility that the driver is performing an intentional steering operation as the magnitude of generated steering torque is larger. With the steering system according to the third aspect and the control method for a steering system according to the fourth aspect, a steering operation intended by the driver is reflected in a steered wheel operation with the second target steered angle reflected in the final target steered angle when the detected actual steering torque is more than the threshold.

In the steering system according to the third aspect and the control method for a steering system according to the fourth aspect, further, the rate of reflection of the second target steered angle in the final target steered angle is raised as the magnitude of the steering torque is increased, and the rate of reflection of the second target steered angle in the final target steered angle is lowered as the magnitude of the steering torque is decreased, when the magnitude of the actual steering torque is more than the threshold. Consequently, switching between steering operation control based on the first target steered angle and steering operation control based on the second target steered angle can be made continuously, and abrupt variations in the behavior of the vehicle can be suppressed when the switching is made. In addition, the steering angle of the steering wheel is reflected in the steered angle in accordance with steering torque applied to the steering wheel by the driver. Therefore, when the driver intentionally performs a steering operation, the vehicle can be caused to behave as intended in accordance with the degree of the steering operation.

In the steering system according to the third aspect, the steering operation control device may be configured to provide an upper limit for an amount of variation per time in the rate of reflection of the second target steered angle in the final target steered angle. The second target steered angle, which is calculated from the actual steering angle, may be varied abruptly, depending on how the driver steers. With the steering system configured as described above, however, an upper limit is provided for the amount of variation per time in the rate of reflection, and it is possible to suppress abrupt variations in the behavior of the vehicle due to abrupt variations in the final target steered angle.

In the steering system according to the third aspect, the steering operation control device may be configured to make an upper limit value for an amount of increase per time in the rate of reflection for a case where the rate of reflection is increased larger than an upper limit value for an amount of decrease per time in the rate of reflection for a case where the rate of reflection is decreased. With the steering system configured as described above, it is possible to suppress abrupt variations in the behavior of the vehicle at the time when the driver takes his/her hands off the steering wheel during drive while immediately reflecting steering intended by the driver in the behavior of the vehicle.

In the steering system according to the third aspect, in addition, the steering operation control device may be configured to vary the final target steered angle to the second target steered angle, irrespective of an upper limit for an amount of increase per time in the rate of reflection, when the final target steered angle has not reached the second target steered angle at a time when the magnitude of the actual steering torque has become more than a predetermined threshold. When steering torque has become large to a certain degree or more, it can be determined that the increase in steering torque is due to steering intended by the driver. With the steering system configured as described above, steering intended by the driver can be immediately reflected in the behavior of the vehicle by varying the final target steered angle to the second target steered angle, irrespective of the upper limit for the amount of increase per time in the rate of reflection, when the magnitude of the actual steering torque has become more than a predetermined value.

In the steering system according to the third aspect, the steering operation control device may be configured to provide an upper limit for an amount of variation per time in the final target steered angle when the final target steered angle is varied to the second target steered angle. With the steering system configured as described above, it is possible to suppress abrupt variations in the final target steered angle toward the second target steered angle.

With the steering system according to the first and third aspects and the control method for a steering system according to the second and fourth aspects, as has been discussed above, a steering operation intended by the driver can be reflected in steered angle control while suppressing reflection of a steering operation not intended by the driver in steered angle control when steered angle control is performed through drive assist.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described below with reference to the drawings. When the number, quantity, amount, range, etc. of elements are mentioned in relation to the embodiments described below, the present disclosure is not limited to such a number etc. unless specifically stated so or if it is in principle clear that the present disclosure is limited thereto. In addition, structures etc. described in relation to the embodiments described below are not necessary to the present disclosure unless specifically stated so or if it is in principle clear that the present disclosure is limited thereto.

Figure 1:
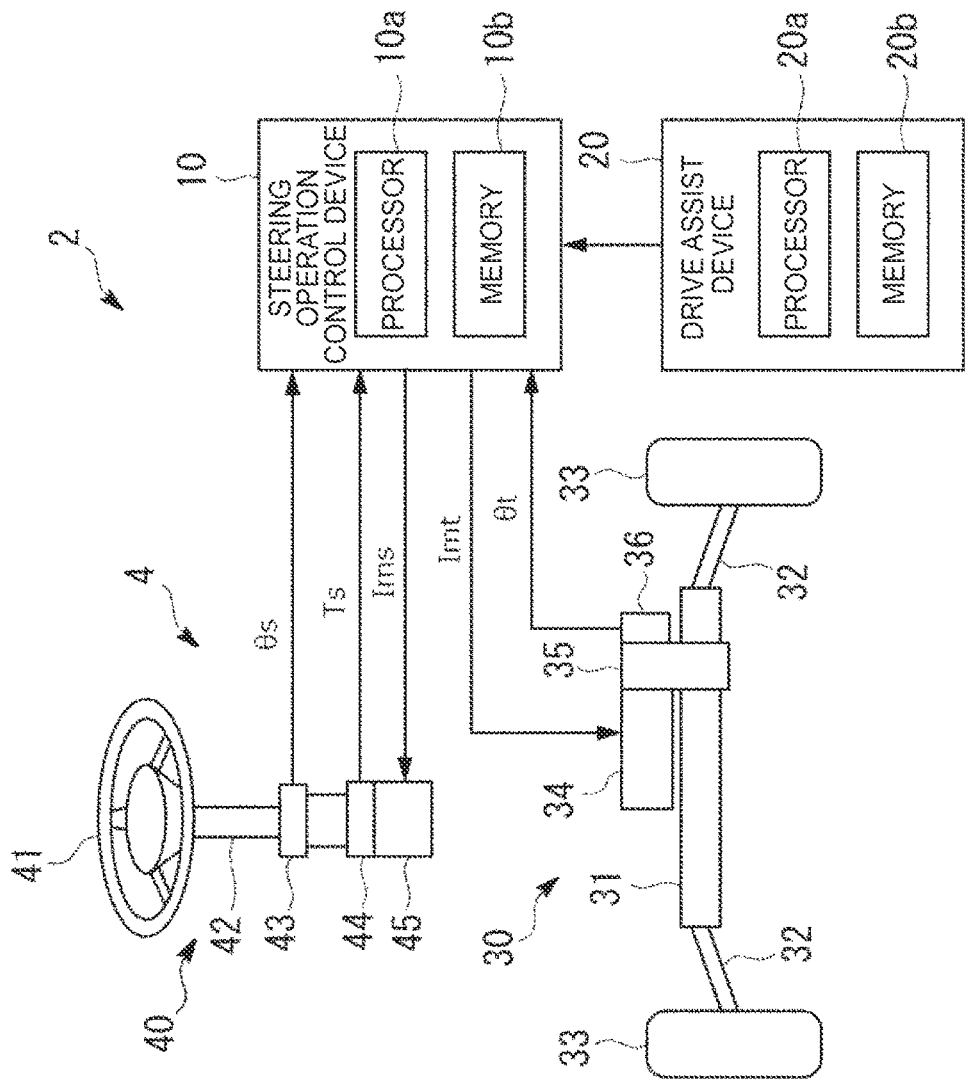
FIG. 1 illustrates the configuration of a steer-by-wire steering system according to a first embodiment of the present disclosure.

First, a first embodiment of the present disclosure will be described. FIG. 1 illustrates the configuration of a steering system 2 according to a first embodiment of the present disclosure. The steering system 2 includes a steering device 4, a steering operation control device 10, and a drive assist device 20. However, the drive assist device 20 may be considered as a device that is external to the steering system 2, and the steering device 4 and the steering operation control device 10 may be considered as constituent elements of the steering system 2. The steering device 4 is composed of a steering mechanism 40 and a steering operation mechanism 30. The steering device 4 is a steer-by-wire steering device in which the steering mechanism 40 and the steering operation mechanism 30 are mechanically decoupled from each other.

The steering mechanism 40 will be described. The steering mechanism 40 includes a steering wheel 41 and a steering motor 45 coupled to the steering wheel 41 via a steering shaft 42. The steering motor is an example of the "second actuator" according to the present disclosure. The steering wheel 41 is a steering member to which a steering operation is input by a driver. The steering motor 45 performs different functions when manual steering is performed by the driver and when automatic steering is performed by the drive assist device 20. When manual steering is performed by the driver, the steering motor 45 functions as a reaction force motor that applies a reaction force that matches the steered angle of steered wheels 33 to the steering wheel 41. When automatic steering is performed by the drive assist device 20, the steering motor 45 rotationally drives the steering wheel 41 such that the steering angle matches a target steered angle (hereinafter referred to as a "drive assist target steered angle") determined by the drive assist device 20. A motor drive current Ims supplied to the steering motor 45 is controlled by the steering operation control device 10. The steering shaft 42 is provided with a steering angle sensor 43 that outputs a signal that matches the rotational angle of the steering wheel 41, that is, a steering angle θs. The steering shaft 42 is also provided with a steering torque sensor 44 that outputs a signal that matches torque that acts on the steering shaft 42, that is, steering torque Ts.

Next, the steering operation mechanism 30 will be described. The steering operation mechanism 30 includes a steering operation motor 34 that steers the steered wheels 33. The steering operation motor 34 is an example of the "first actuator" according to the present disclosure. The steering operation motor 34 is attached to a rack shaft 31 via a speed reduction mechanism 35. The rack shaft 31 is not mechanically coupled to the steering shaft 42. The steered wheels 33 are coupled to the rack shaft 31 via tie rods 32. The steered angle of the steered wheels 33 is changed via the tie rods 32 by linearly moving the rack shaft 31 in the axial direction by rotating the steering operation motor 34. A steered angle sensor 36 that outputs a signal that matches a steered angle θt of the steered wheels 33 is attached to the steering operation motor 34. The steering operation control device 10 controls a motor drive current Imt to be supplied to the steering operation motor 34 based on the steered angle θt which is fed back from the steered angle sensor 36.

The steering operation control device 10 is an electronic control unit (ECU) that has at least one processor 10a and at least one memory 10b. The memory 10b stores various data, including a map for use for steering operation control, and various control programs. The steering operation control device 10 implements various functions related to steering operation control by the processor 10a reading the programs from the memory 10b and executing the programs. The ECU which constitutes the steering operation control device 10 may be a collection of a plurality of ECUs.

The drive assist device 20 is an ECU that has at least one processor 20a and at least one memory 20b. The memory 20b stores various data, including a map for use for drive assist, and various control programs. The drive assist device 20 implements various functions related to drive assist, in particular steered angle control, by the processor 20a reading the programs from the memory 20b and executing the programs. The ECU which constitutes the drive assist device 20 may be a collection of a plurality of ECUs. The drive assist device 20 and the steering operation control device 10 may be implemented as software functions in an identical ECU, rather than separate ECUs.

Figure 2:
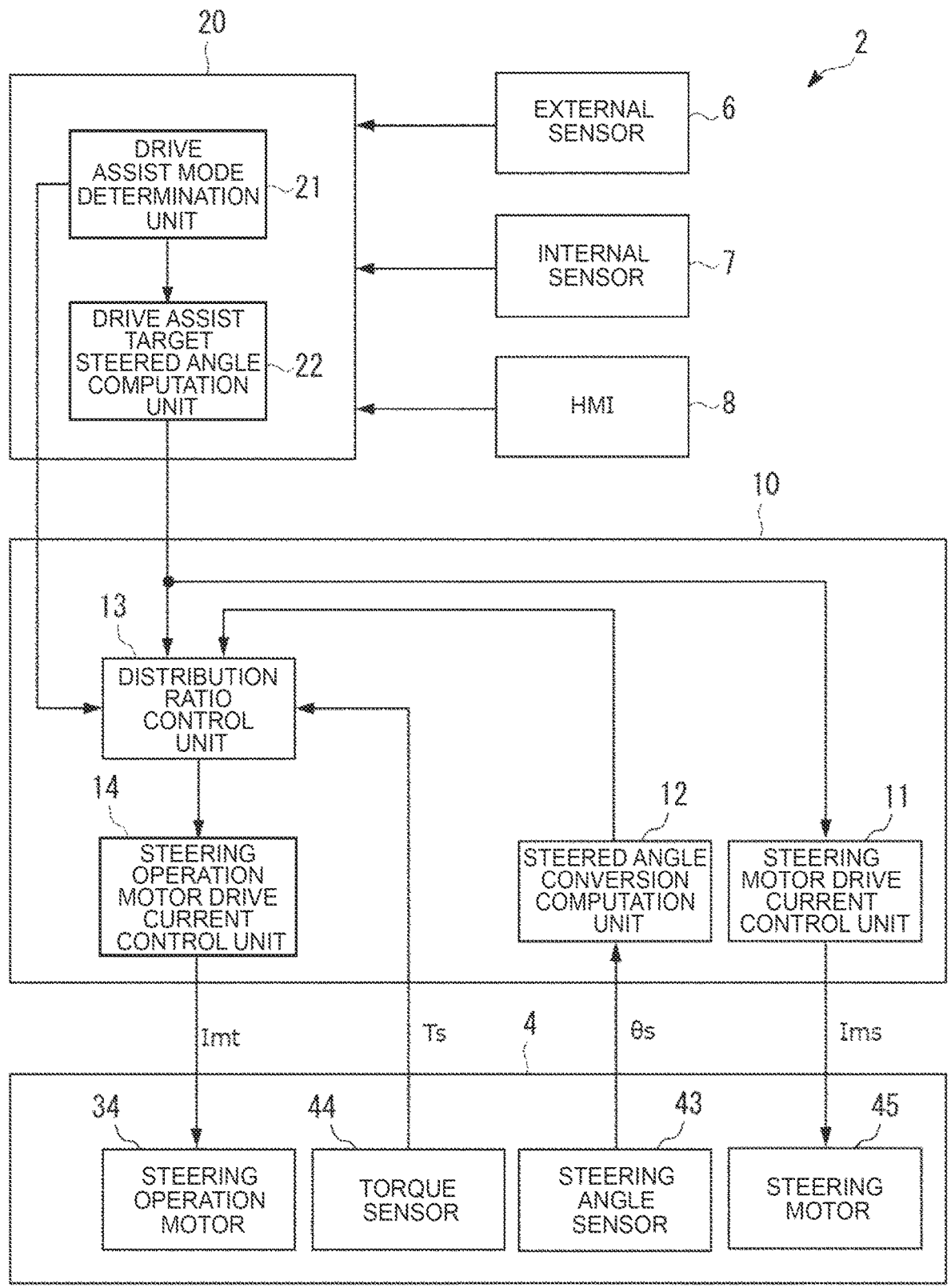
FIG. 2 is a block diagram illustrating the functions of the steering system illustrated in FIG. 1.

FIG. 2 is a block diagram illustrating the functions of the steering system 2. The functions of the steering system 2, in particular the functions of the steering operation control device 10 and the drive assist device 20 for a case where steered angle control is performed through drive assist, will be described below with reference to FIG. 2.

The drive assist device 20 includes a drive assist mode determination unit 21 and a drive assist target steered angle computation unit 22. These components are implemented as the functions of the drive assist device 20 when the programs stored in the memory 20b are executed by the processor 20a.

The drive assist mode determination unit 21 acquires information from an external sensor 6, information from an internal sensor 7, and information from a human-machine interface (HMI) 8. The external sensor 6 is a sensor that acquires information related to the external situation of the vehicle. The external sensor 6 includes at least one of a camera, a millimeter wave radar, and a laser infrared radar (LiDAR). The internal sensor 7 is a sensor that detects the travel state of the vehicle. The internal sensor 7 includes at least one of a vehicle speed sensor, an acceleration sensor, and a yaw rate sensor. The HMI 8 is a unit that allows the driver to input information, and may be a touch panel or a switch, for example. The drive assist mode is selected by the driver himself/herself through an operation performed by the driver using the HMI 8 in some cases, and is automatically determined based on the information from the external sensor 6 and the information from the internal sensor 7 in the other cases.

The drive assist mode determined by the drive assist mode determination unit 21 is the mode of drive assist related to steered angle control. Examples of the drive assist mode include lane following assist for causing the vehicle to travel at the center of a lane, emergency avoidance for allowing the vehicle to avoid a collision with an obstacle, lane change, parking assist, etc. These drive assist modes are given orders of priority. A drive assist mode that affects safety significantly is always given priority. For example, when a condition for the emergency avoidance is met during execution of the lane following assist which is selected by the driver, the drive assist mode is automatically switched from the lane following assist mode to the emergency avoidance mode.

The drive assist target steered angle computation unit 22 computes a drive assist target steered angle (first target steered angle), which is a target steered angle for drive assist, in accordance with the drive assist mode determined by the drive assist mode determination unit 21. The target steered angle is computed using the information from the external sensor 6 and the information from the internal sensor 7. For example, when the drive assist mode is the lane following assist mode, the drive assist target steered angle is computed so as to draw a travel locus that follows the center position of the lane acquired by the external sensor 6. When the drive assist mode is the emergency avoidance mode, meanwhile, the drive assist target steered angle is computed so as to draw a travel locus that avoids an obstacle based on the position and the speed of the obstacle acquired by the external sensor 6. The drive assist target steered angle computed by the drive assist target steered angle computation unit 22 is transmitted to the steering operation control device 10 together with the drive assist mode determined by the drive assist mode determination unit 21.

The steering operation control device 10 includes a steering motor drive current control unit 11, a steered angle conversion computation unit 12, a distribution ratio control unit 13, and a steering operation motor drive current control unit 14. These components are implemented as the functions of the steering operation control device 10 when the programs stored in the memory 10b are executed by the processor 10a.

The steering motor drive current control unit 11 generates a steering motor drive current Ims to be supplied to the steering motor 45 based on the drive assist target steered angle received from the drive assist device 20. Particularly, the steering motor drive current control unit 11 converts the drive assist target steered angle into a steering angle based on a correlation uniquely established between the steered angle and the steering angle. Next, the steering motor drive current control unit 11 computes a steering motor drive current Ims (steering angle command value) to be provided to the steering motor 45 in order to achieve the steering angle obtained through the conversion. When the steering motor drive current Ims is provided to the steering motor 45, the steering motor 45 rotationally drives the steering wheel 41 to a steering angle that matches the drive assist target steered angle.

The steered angle conversion computation unit 12 converts the steering angle (actual steering angle) θs, which is detected by the steering angle sensor 43, into a steered angle based on the correlation uniquely established between the steered angle and the steering angle. The steered angle obtained through the conversion is defined as a driver target steered angle which means a target steered angle requested by the driver. When the driver just places his/her hands on the steering wheel 41, rotation of the steering wheel 41 by the steering motor 45 is not hindered. Therefore, the driver target steered angle which is calculated from the actual steering angle θs of the steering wheel 41 is generally equal to the drive assist target steered angle, on which the motor drive current Ims for driving the steering motor 45 is based. When the driver makes input to the steering wheel 41, however, the steering wheel 41 is rotated relative to the steering motor 45. Therefore, there also occurs a difference between the driver target steered angle, which is computed from the actual steering angle θs of the steering wheel 41, and the drive assist target steered angle.

The driver target steered angle computed by the steered angle conversion computation unit 12 is input to the distribution ratio control unit 13 together with the drive assist target steered angle received from the drive assist device 20. The steering torque Ts detected by the steering torque sensor 44 and information on the drive assist mode determined by the drive assist device 20 are further input to the distribution ratio control unit 13.

The distribution ratio control unit 13 computes a final target steered angle from the driver target steered angle and the drive assist target steered angle using a distribution ratio map prepared in advance. The distribution ratio means the ratio of distribution between the drive assist target steered angle and the driver target steered angle in the final target steered angle. When the distribution ratio is zero, the final target steered angle coincides with the drive assist target steered angle. When the distribution ratio is 1, the final target steered angle coincides with the driver target steered angle. Meanwhile, when the distribution ratio is 0.5, for example, the final target steered angle is the average value of the driver target steered angle and the drive assist target steered angle. Hence, the distribution ratio can also be considered as the rate of reflection of the driver target steered angle in the final target steered angle. The distribution ratio map will be discussed in detail later. The distribution ratio map is prepared for each of the drive assist modes. In the distribution ratio map, the distribution ratio is changed in accordance with the steering torque Ts.

The steering operation motor drive current control unit 14 computes a steering operation motor drive current Imt (steered angle command value) to be supplied to the steering operation motor 34 based on the final target steered angle which is computed by the distribution ratio control unit 13. In computing the steering operation motor drive current Imt from the final target steered angle, a filter process for suppressing abrupt variations in the steering operation motor drive current Imt may be performed. When the steering operation motor drive current Imt is provided to the steering operation motor 34, the steering operation motor 34 causes the steering operation mechanism 30 to operate so as to achieve the final target steered angle.

Next, the distribution ratio map will be described in detail with reference to FIGS. 3A and 3B. In the distribution ratio map, the ratio of distribution between the driver target steered angle and the drive assist target steered angle is set for the magnitude (hereinafter also referred to as a "torque sensor value") of steering torque detected by the steering torque sensor 44. Two thresholds, namely an intervention threshold and a switching threshold, are set for the torque sensor value. The switching threshold is larger than the intervention threshold.

In the distribution ratio map, the distribution ratio is set to zero while the torque sensor value is zero to the intervention threshold. This means that the drive assist target steered angle is set, as it is, as the final target steered angle, irrespective of increase and decrease in the torque sensor value, before the torque sensor value reaches the intervention threshold. Hence, even when a steering operation is performed by the driver, the steering operation by the driver is not reflected in the steered wheel operation if the magnitude of steering torque detected by the steering torque sensor 44 along with the steering operation is equal to or less than the intervention threshold.

The steering torque detected by the steering torque sensor 44 acts as a reaction force for the driver. If the driver attempts to intentionally intervene in steered angle control, the driver should operate the steering wheel 41 so as to overcome the reaction force, and as a result larger steering torque should be generated. Hence, even when a steering operation is performed by the driver, the steering operation is considered to be not intended by the driver if steering torque detected along with the steering operation is not large. In the distribution ratio map, only the drive assist target steered angle is reflected in the final target steered angle if the torque sensor value is not more than the intervention threshold. That is, reflection of a steering operation not intended by the driver in steered angle control is suppressed.

In the distribution ratio map, in addition, the distribution ratio is constant at 1 when the torque sensor value is larger than the switching threshold. This means that the driver target steered angle is set, as it is, as the final target steered angle if the torque sensor value is larger than the switching threshold.

When the driver makes large input to the steering wheel 41 and the difference between the steering angle of the steering wheel 41 and the rotational angle of the steering shaft 42 due to the steering motor 45 becomes large, steering torque that acts on the steering shaft 42 also becomes large. There is a higher possibility that the driver is performing an intentional steering operation as the magnitude of generated steering torque is larger. In the distribution ratio map, only the driver target steered angle is reflected in the final target steered angle when the torque sensor value exceeds the switching threshold. The driver target steered angle is calculated from the steering angle which is detected by the steering angle sensor 43, and represents a steered angle requested by the driver. A steering operation intended by the driver is reflected in the steered wheel operation when the driver target steered angle is reflected in the final target steered angle.

In the distribution ratio map, the distribution ratio is set to be proportional to an increase in the torque sensor value when the torque sensor value is larger than the intervention threshold and equal to or less than the switching threshold. With such setting of the distribution ratio, the final target steered angle which is set when the torque sensor value is between the two thresholds can be calculated by the following expressions using the driver target steered angle, the drive assist target steered angle, and the torque sensor value as parameters.

Final target steered angle=driver target steered angle×distribution ratio+drive assist target steered angle×(1−distribution ratio)

Distribution ratio=(torque sensor value−intervention threshold)/(switching threshold−intervention threshold)

As seen from the above expressions, when the torque sensor value is more than the intervention threshold, the rate of reflection of the drive assist target steered angle in the final target steered angle is gradually lowered as the torque sensor value is increased, while the rate of reflection of the driver target steered angle in the final target steered angle is raised. Consequently, switching from steering operation control based on the drive assist target steered angle to steering operation control based on the driver target steered angle can be made continuously, and abrupt variations in the behavior of the vehicle can be suppressed when the switching is made. As seen from the above expressions, in addition, the steering angle of the steering wheel 41 is reflected in the steered angle in accordance with steering torque applied to the steering wheel 41 by the driver. Therefore, when the driver intentionally performs a steering operation, the vehicle can be caused to behave as intended in accordance with the degree of the steering operation.

The distribution ratio map prepared as described above is prepared for each of the drive assist modes. For example, FIG. 3A illustrates an example of a distribution ratio map for use in steered angle control during lane following assist, and FIG. 3B illustrates an example of a distribution ratio map for use in steered angle control during emergency avoidance. The two distribution ratio maps differ in the magnitude of the intervention threshold and the switching threshold.

Figure 3A:
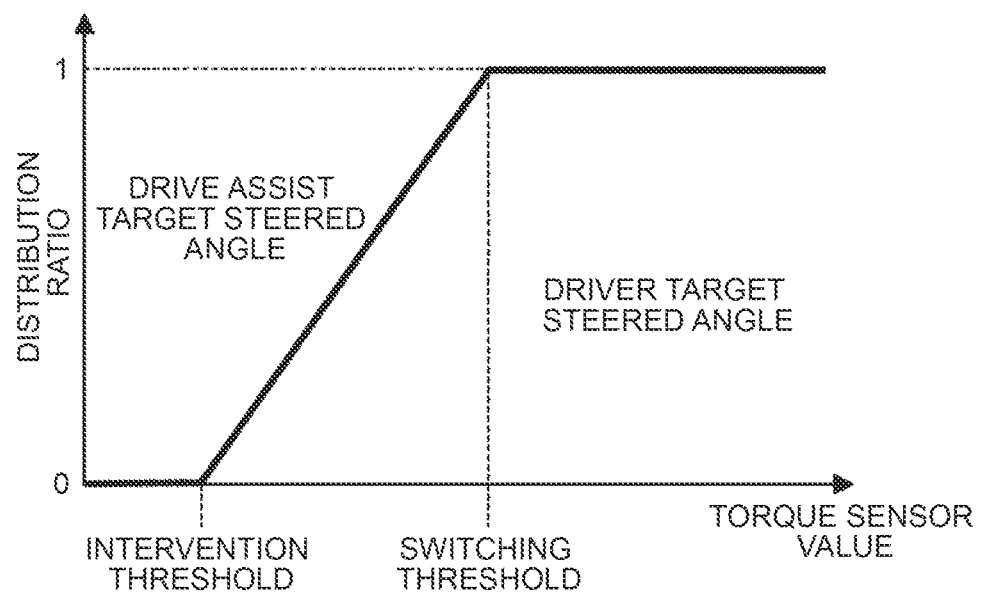
FIG. 3A illustrates an example of a distribution ratio map for use in steered angle control during lane following assist.

In the distribution ratio map illustrated in FIG. 3A, the intervention threshold and the switching threshold are set to relatively small values. In steered angle control during lane following assist, a steered wheel operation is gentle, and variations in the steering angle of the steering wheel 41 which is controlled based on the drive assist target steered angle are also gentle. Hence, there is a high possibility that steering torque generated when lane following assist is performed is generated by an intentional operation by the driver. Hence, the switching threshold is set to be small in the distribution ratio map for lane following assist. Meanwhile, the intervention threshold is set to such a torque sensor value that slight input of the steering angle due to vibration of the vehicle body etc. is not reflected in the steered angle.

Figure 3B:
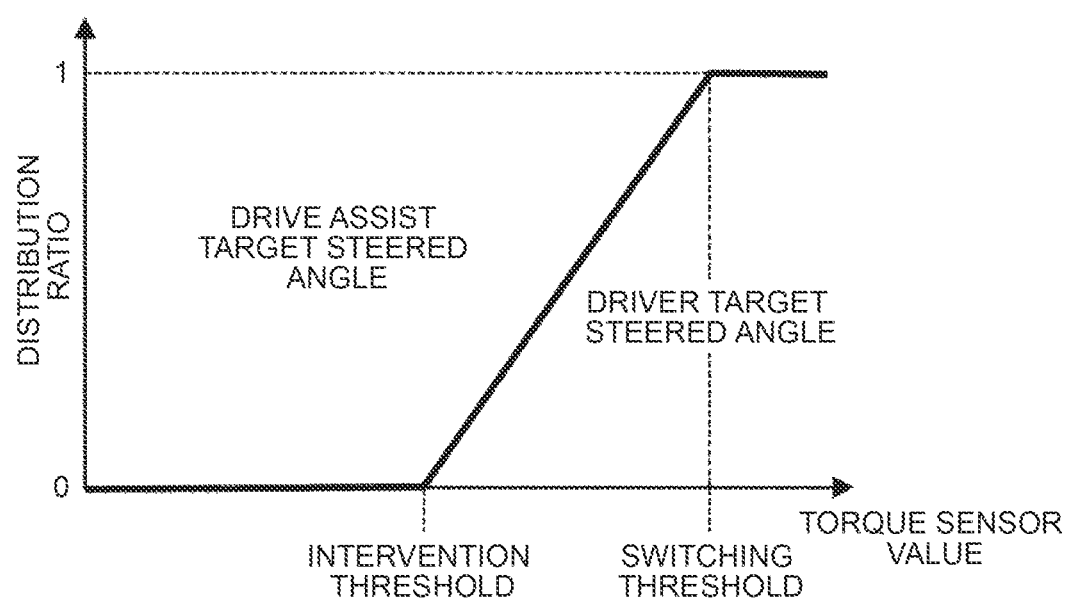
FIG. 3B illustrates an example of a distribution ratio map for use in steered angle control during emergency avoidance.

In the distribution ratio map illustrated in FIG. 3B, the intervention threshold and the switching threshold are set to relatively large values. In steered angle control during emergency avoidance, an abrupt steered wheel operation is performed, and the steering angle of the steering wheel 41 which is controlled based on the drive assist target steered angle is also varied abruptly. Therefore, a large reaction force acts on the driver from the steering wheel 41 even when the driver just places his/her hands on the steering wheel 41. The reaction force which acts on the driver is larger as the drive force which acts on the steering shaft is larger. As a result, large steering torque is occasionally generated by an abrupt steered wheel operation due to emergency avoidance, even when not intended by the driver. Hence, in the distribution ratio map for emergency avoidance, the intervention threshold and the switching threshold are set to relatively large values, in order to suppress reflection of a steering operation not intended by the driver in steered angle control.

As described above, when the drive assist mode is a mode in which an abrupt steered wheel operation is performed, the intervention threshold and the switching threshold in the distribution ratio map are set to large values compared to a mode in which a gentle steered wheel operation is performed. This applies not only to lane following assist and emergency avoidance, but also to the other drive assist modes. That is, the intervention threshold and the switching threshold in the distribution ratio map are varied in accordance with whether a steered wheel operation due to drive assist is gentle or abrupt. With the intervention threshold and the switching threshold varied in accordance with whether a steered wheel operation due to drive assist is gentle or abrupt, it is possible to suppress a steering operation not intended by the driver being reflected in steered angle control in situations in which drive assist with different roles or functions is performed. With the intervention threshold and the switching threshold varied in accordance with whether a steered wheel operation due to drive assist is gentle or abrupt, in addition, it is also possible to allow a steering operation intended by the driver to be reflected in steered angle control in situations in which drive assist with different roles or functions is performed.

Finally, an example of calculation of the final target steered angle performed using the distribution ratio map described above will be introduced. In the upper graph in each of FIGS. 4 to 6, variations in the drive assist target steered angle over time are indicated by the long-dashed double-short dashed line, variations in the driver target steered angle over time are indicated by the dashed line, and variations in the final target steered angle over time are indicated by the continuous line. In the lower graph in each of FIGS. 4 to 6, meanwhile, variations in the torque sensor value over time are indicated together with the intervention threshold and the switching threshold.

Figure 4:
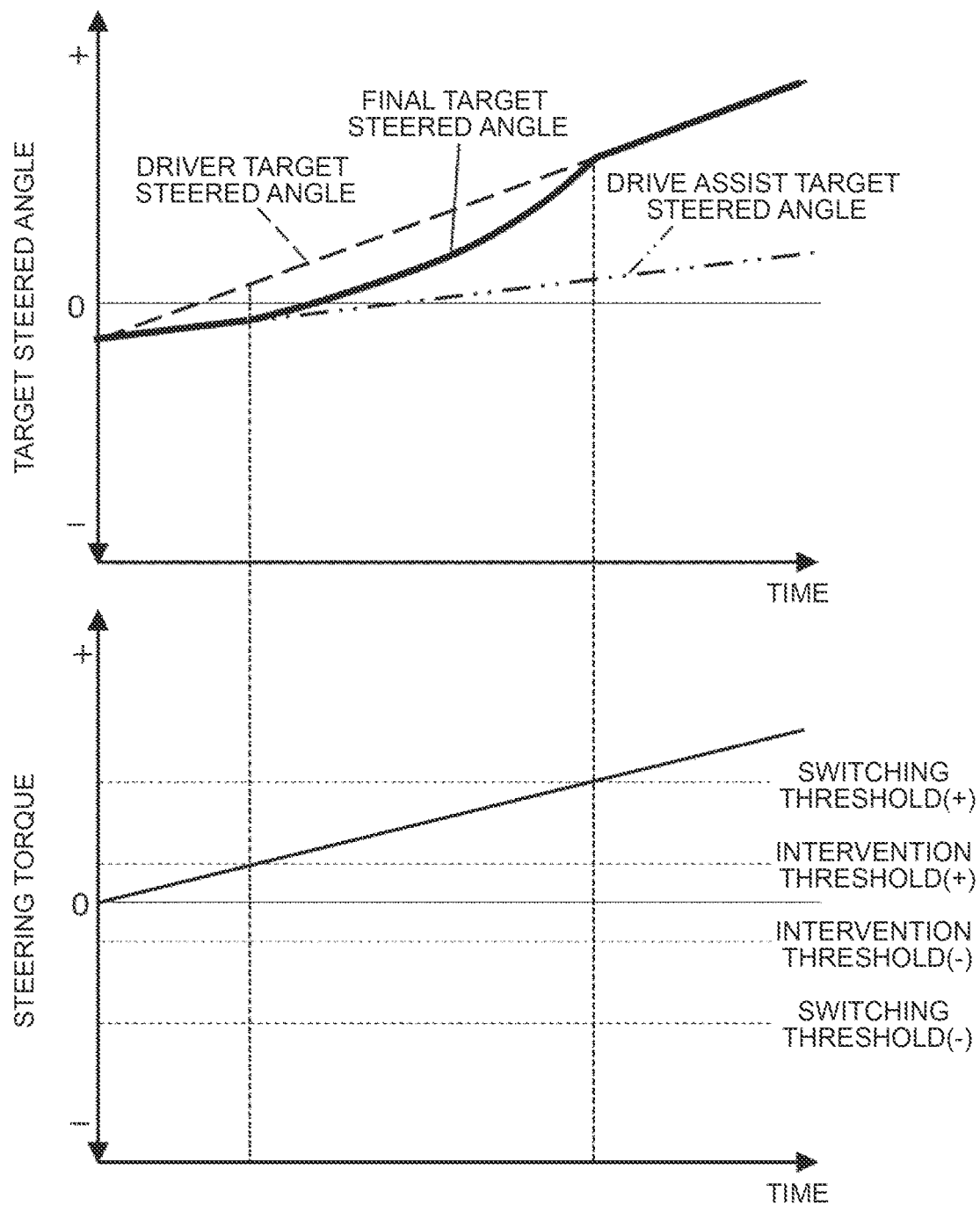
FIG. 4 illustrates a first part of an example of calculation of a final target steered angle for a case where steered angle control is performed during lane following assist.

FIG. 4 illustrates a first part of an example of calculation of the final target steered angle for a case where steered angle control is performed during lane following assist. FIG. 4 indicates an example in which a steering operation intended by the driver has been performed while lane following assist is executed. The driver target steered angle is caused to deviate from the drive assist target steered angle by a steering operation intended by the driver, and accordingly the magnitude of steering torque detected by the steering torque sensor 44 is increased. The drive assist target steered angle is calculated as the final target steered angle before the magnitude of steering torque exceeds the intervention threshold. The driver target steered angle is reflected in the final target steered angle after the magnitude of steering torque exceeds the intervention threshold. The final target steered angle is brought closer to the driver target steered angle as the magnitude of steering torque becomes larger. The driver target steered angle is calculated, as it is, as the final target steered angle when the magnitude of the steering torque exceeds the switching threshold. Consequently, a steered wheel operation can be performed as intended by the driver.

Figure 5:
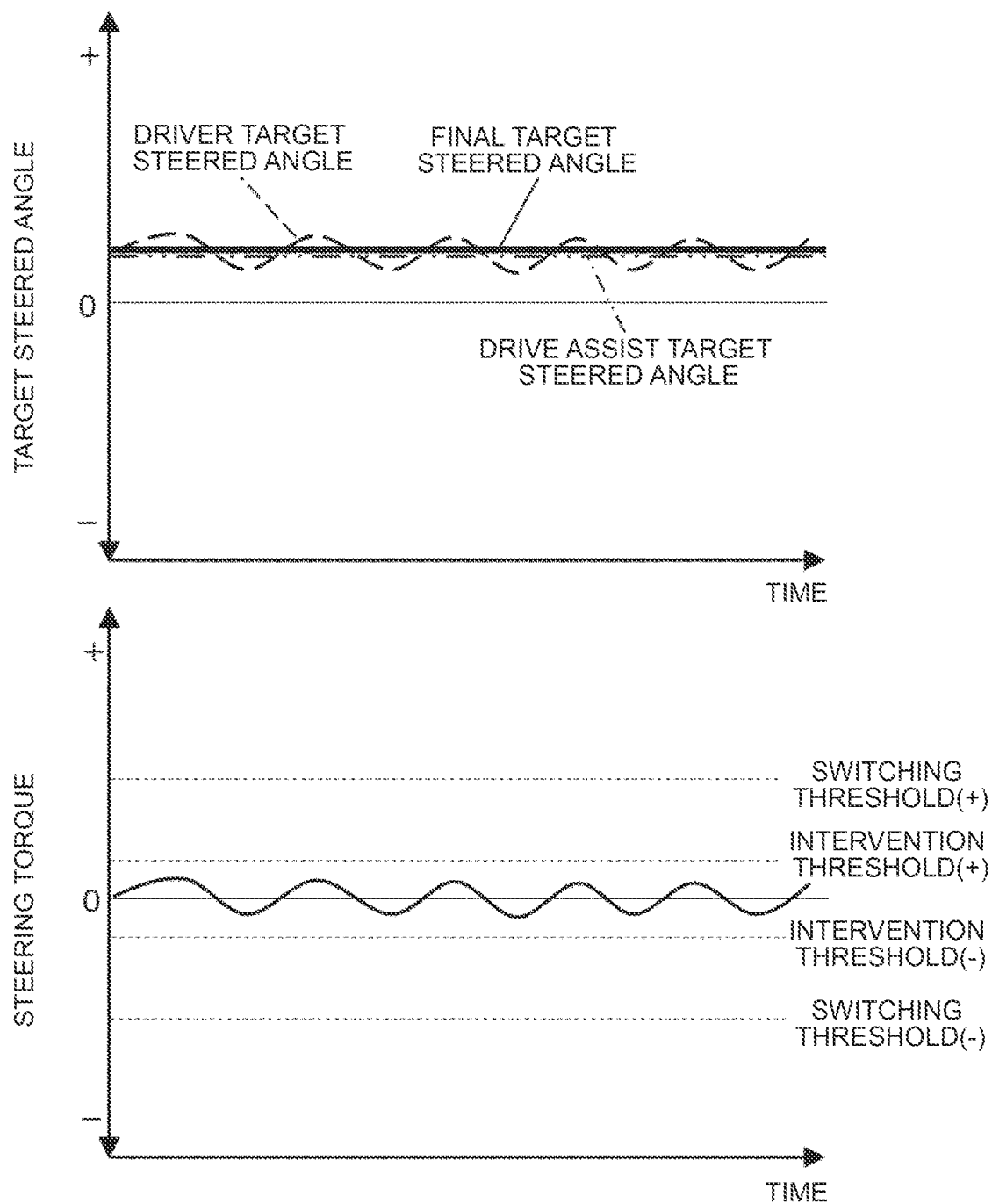
FIG. 5 illustrates a second part of the example of calculation of the final target steered angle for a case where steered angle control is performed during lane following assist.

FIG. 5 illustrates a second part of the example of calculation of the final target steered angle for a case where steered angle control is performed during lane following assist. FIG. 5 indicates an example in which a steering operation not intended by the driver has been performed while lane following assist is executed. When steering not intended by the driver is input to the steering wheel 41 because of vibration etc. of the vehicle body, the driver target steered angle which is calculated form the steering angle is vibrational. Since the steering operation is not intended by the driver, however, large steering torque is not generated, and deviation of the driver target steered angle from the drive assist target steered angle is in a slight range. When generated steering torque is small and the magnitude of the steering torque is in the range of the intervention threshold, the drive assist target steered angle is calculated, as it is, as the final target steered angle. Consequently, it is possible to suppress steered angle control performed during lane following assist being hindered by disturbance such as vibration of the vehicle body.

Figure 6:
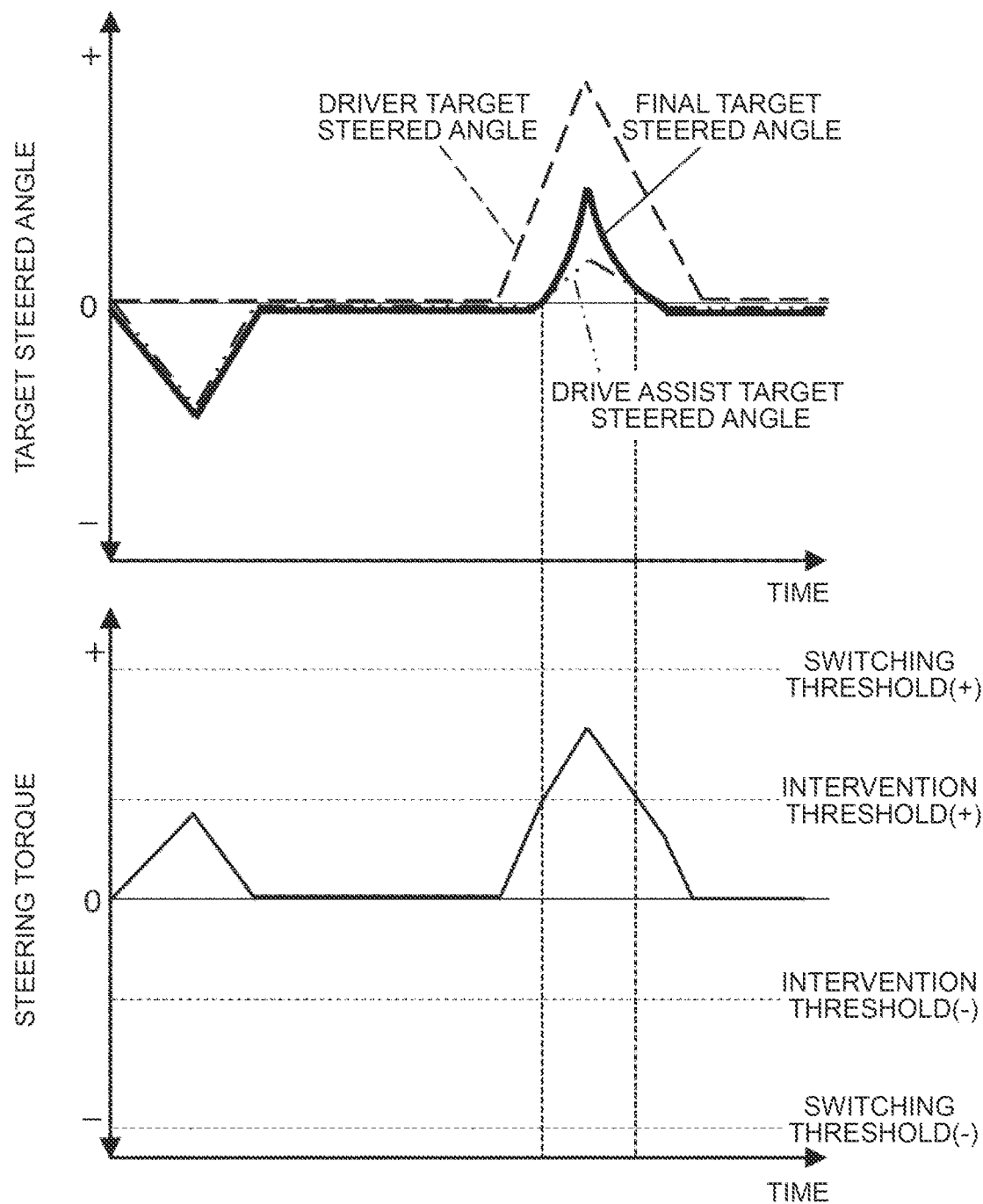
FIG. 6 illustrates an example of calculation of the final target steered angle for a case where steered angle control is performed during emergency avoidance.

FIG. 6 illustrates an example of calculation of the final target steered angle for a case where steered angle control is performed during emergency avoidance. FIG. 6 indicates an example in which a steered wheel operation for emergency avoidance is performed twice by the drive assist device 20. During the first steered wheel operation for emergency avoidance, the driver holds the steering wheel 41 so as not to be movable, and steering torque as a reaction force is generated. In case of emergency avoidance, however, the intervention threshold is set to a large value, which suppresses steering torque exceeding the intervention threshold. Hence, for the first steered wheel operation for emergency avoidance, the drive assist target steered angle is calculated, as it is, as the final target steered angle. Consequently, it is possible to suppress steered angle control for emergency avoidance being hindered by a steering operation not intended by the driver, because of input of steering torque not intended by the driver. During the second steered wheel operation for emergency avoidance, the driver intentionally performs a steering operation. In this case, the driver target steered angle is reflected in the final target steered angle when the magnitude of steering torque exceeds the intervention threshold. Consequently, the vehicle can be caused to behave as intended by the driver.

Figure 7:
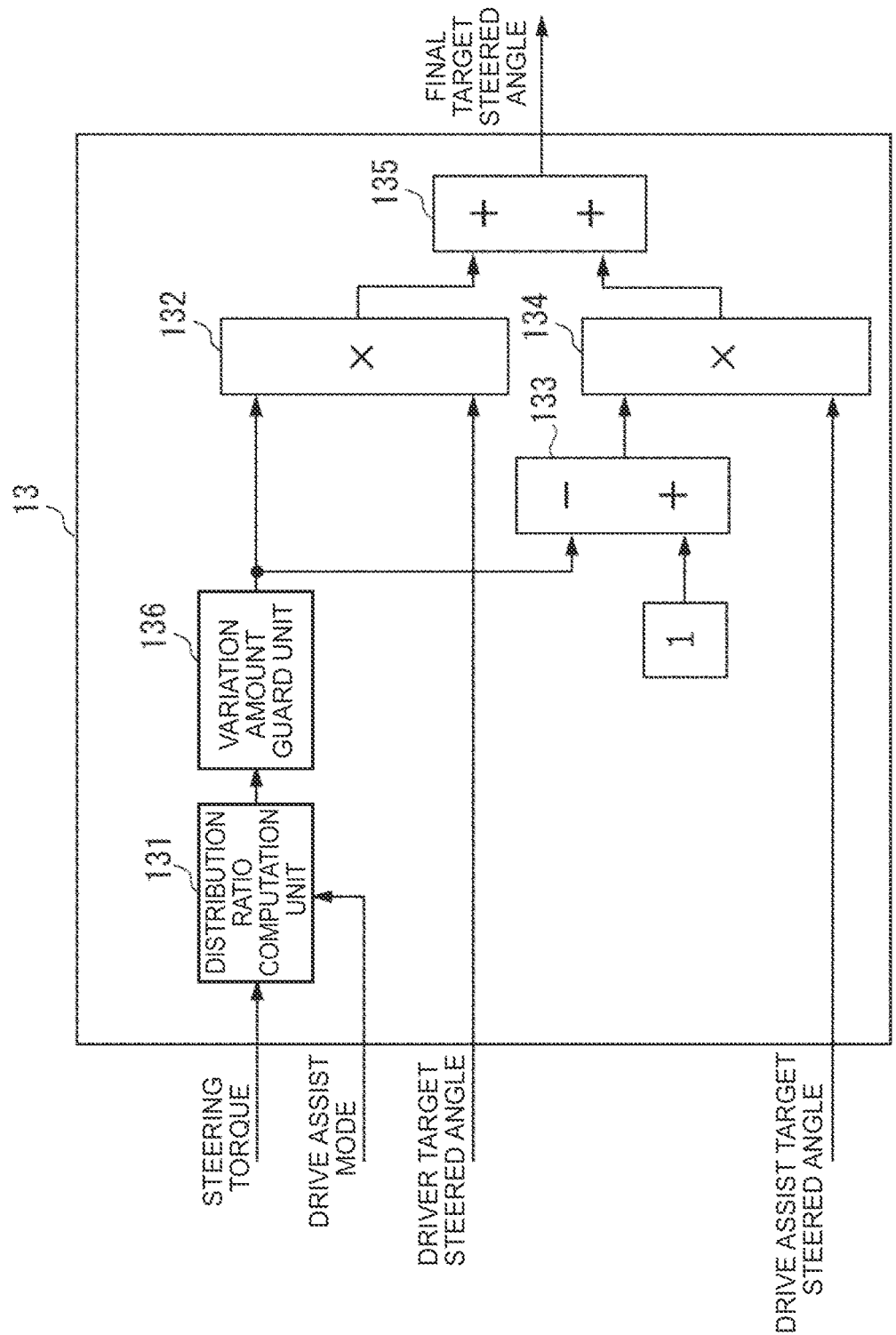
FIG. 7 is a block diagram illustrating the function of a distribution ratio control unit according to a second embodiment of the present disclosure.

Next, a second embodiment of the present disclosure will be described. The difference between the second embodiment and the first embodiment is the function of the distribution ratio control unit 13. FIG. 7 is a block diagram illustrating the function of the distribution ratio control unit 13 according to the second embodiment. Among the functions illustrated in the block diagram, a variation amount guard unit 136 is a characteristic function of the second embodiment, and the other functions are the same as those according to the first embodiment. The function of the distribution ratio control unit 13 according to the second embodiment will be described below.

The distribution ratio control unit 13 according to the second embodiment includes a distribution ratio computation unit 131, a driver target steered angle distribution unit 132, a drive assist distribution ratio computation unit 133, a drive assist target steered angle distribution unit 134, a post-distribution target steered angle computation unit 135, and a variation amount guard unit 136. These functions are implemented when the programs stored in the memory 10b of the steering operation control device 10 are executed by the processor 10a.

The distribution ratio computation unit 131 computes a distribution ratio that matches the drive assist mode and the magnitude of steering torque using the distribution ratio map described in relation to the first embodiment. The distribution ratio means the rate of reflection of the driver target steered angle in the final target steered angle. The distribution ratio computed by the distribution ratio computation unit 131 is subjected to a guard process by the variation amount guard unit 136 to be discussed later, and thereafter input to the driver target steered angle distribution unit 132 and the drive assist distribution ratio computation unit 133.

The driver target steered angle distribution unit 132 calculates a value obtained by multiplying the driver target steered angle by the distribution ratio. The drive assist distribution ratio computation unit 133 computes a drive assist distribution ratio by subtracting the distribution ratio from 1. The drive assist distribution ratio means the rate of reflection of the drive assist target steered angle in the final target steered angle. The drive assist distribution ratio is input to the drive assist target steered angle distribution unit 134. The drive assist target steered angle distribution unit 134 calculates a value obtained by multiplying the drive assist target steered angle by the drive assist distribution ratio.

The output of the driver target steered angle distribution unit 132 and the output of the drive assist target steered angle distribution unit 134 are input to the post-distribution target steered angle computation unit 135. The post-distribution target steered angle computation unit 135 computes a post-distribution target steered angle by summing the two input values. The post-distribution target steered angle is output from the distribution ratio computation unit 131 as the final target steered angle.

The variation amount guard unit 136, which is a characteristic portion of the distribution ratio control unit 13 according to the second embodiment, provides an upper limit for the amount of variation per time in the distribution ratio computed by the distribution ratio computation unit 131. The set upper limit value is different between the case where the distribution ratio is increased and the case where the distribution ratio is decreased. Particularly, when the distribution ratio is increased in accordance with an increase in steering torque, the upper limit value (increase guard value) set for the amount of increase per time is set to a relatively large value. When the distribution ratio is decreased in accordance with a decrease in steering torque, on the other hand, the upper limit value (decrease guard value) set for the amount of decrease per time is set to a relatively small value. That is, the variation amount guard unit 136 allows a relatively fast increase in the distribution ratio, but does not allow a fast decrease in the distribution ratio.

Figure 8:
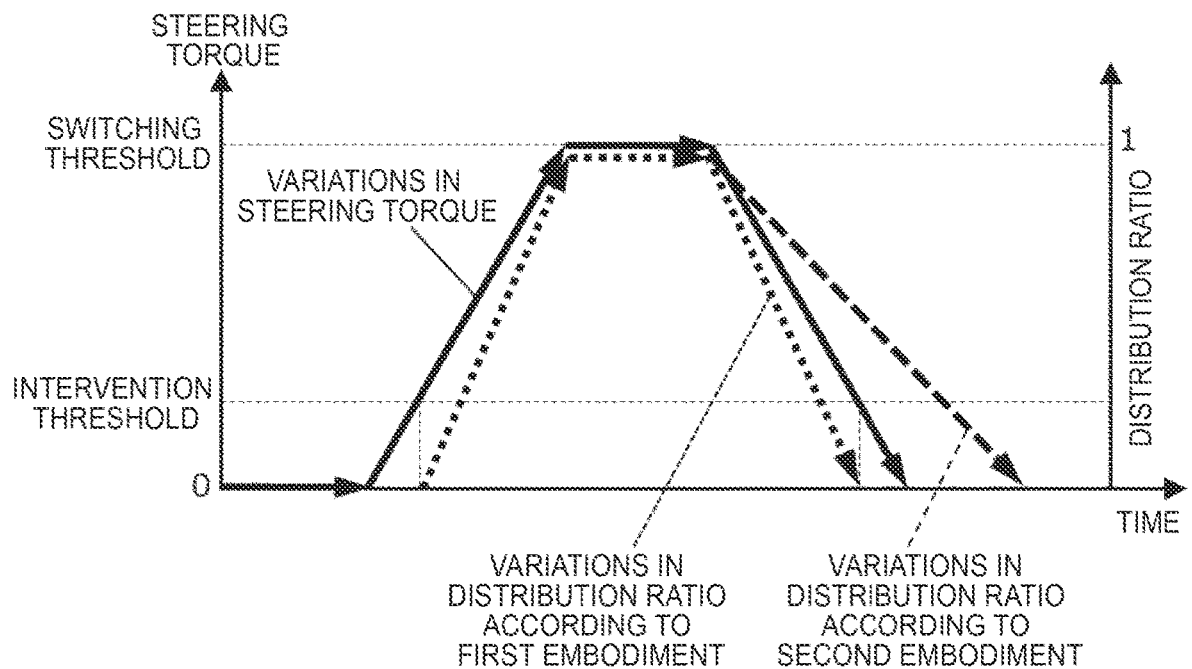
FIG. 8 illustrates an image of time-series variations in the distribution ratio caused by the distribution ratio control unit illustrated in FIG. 7.
Figure 9:
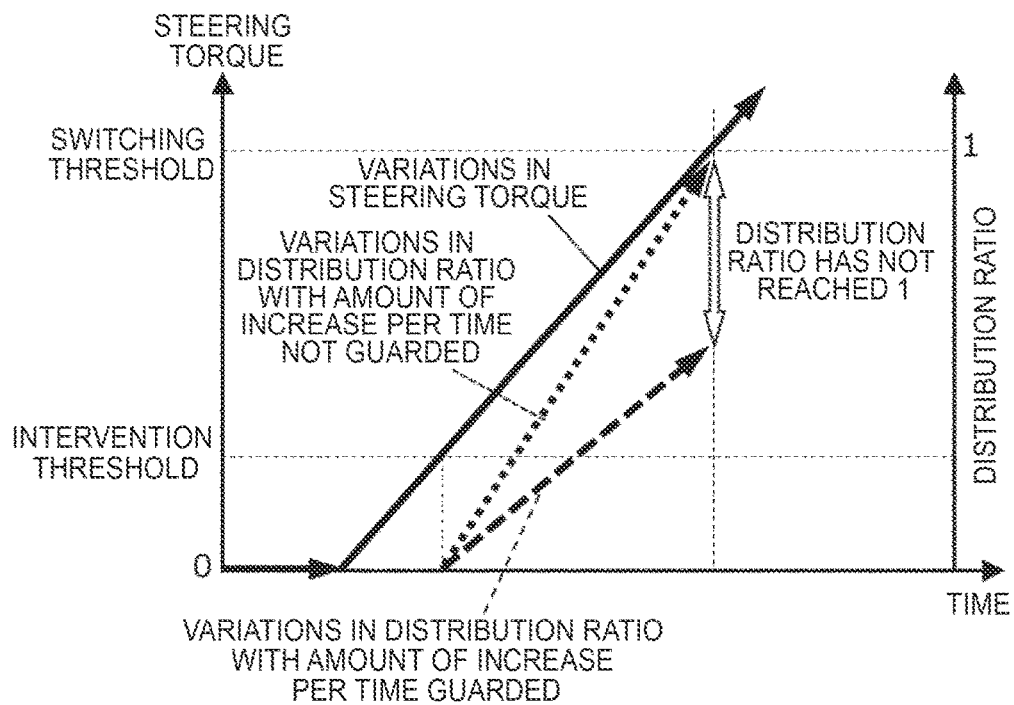
FIG. 9 illustrates an image of time-series variations in the distribution ratio caused when the amount of increase per time in the distribution ratio is guarded using an upper limit value.

FIG. 8 illustrates an image of time-series variations in the distribution ratio caused by the distribution ratio control unit 13. FIG. 8 indicates time-series variations in the distribution ratio according to the first embodiment as a comparative example, together with time-series variations in the distribution ratio according to the second embodiment. In the example indicated in FIG. 8, when the distribution ratio is increased, the amount of increase per time in the distribution ratio is not limited by the upper limit value (increase guard value), and variations in the distribution ratio are the same as variations in the distribution ratio according to the first embodiment. When the distribution ratio is decreased, on the other hand, the amount of decrease per time in the distribution ratio is limited by the upper limit value (decrease guard value), and variations in the distribution ratio are gentler than variations in the distribution ratio according to the first embodiment.

In the second embodiment, when steering torque is increased, an upper limit value provided for the amount of increase per time in the distribution ratio is a relatively large value. By allowing an abrupt increase in the distribution ratio to a certain degree, it is possible to immediately bring the final target steered angle to the driver target steered angle, and immediately reflect steering intended by the driver in the behavior of the vehicle. In the second embodiment, when steering torque is decreased, an upper limit value provided for the amount of decrease per time in the distribution ratio is a relatively small value. By not allowing an abrupt decrease in the distribution ratio, it is possible to cause the final target steered angle to gently approach the drive assist target steered angle, and suppress abrupt variations in the behavior of the vehicle that occur when the driver takes his/her hands off the steering wheel.

Next, with regard to a third embodiment of the present disclosure, an issue of the second embodiment to be addressed by the third embodiment will be described first. In the second embodiment, the variation amount guard unit 136 is provided after the distribution ratio computation unit 131. If the variation amount guard unit 136 does not guard the amount of increase per time in the distribution ratio using the upper limit value, the distribution ratio output from the variation amount guard unit 136 reaches 1 when steering torque has reached the switching threshold. If the variation amount guard unit 136 guards the amount of increase per time in the distribution ratio using the upper limit value, however, the distribution ratio has a value that is less than 1 when steering torque has reached the switching threshold. Therefore, the final target steered angle does not reach the driver target steered angle even when steering torque has reached the switching threshold. It can be determined that the driver is steering intentionally when steering torque is increased to a certain magnitude. When the amount of increase per time in the distribution ratio is guarded using the upper limit value, however, steering intended by the driver is not completely reflected in the behavior of the vehicle.

Figure 10:
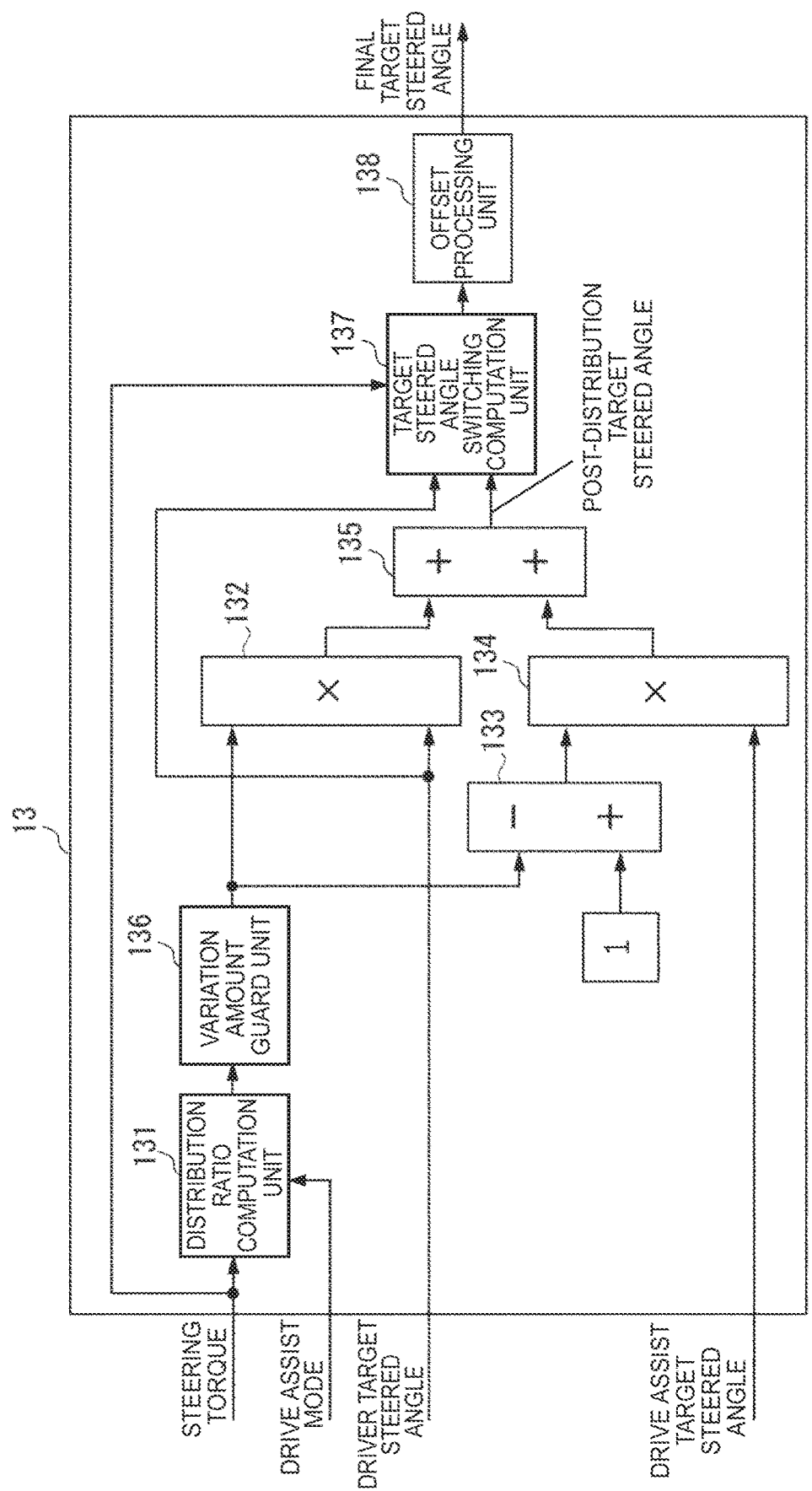
FIG. 10 is a block diagram illustrating the function of a distribution ratio control unit according to a third embodiment of the present disclosure.

In the third embodiment, in order to address the above issue, the distribution ratio control unit 13 is provided with an additional function. FIG. 10 is a block diagram illustrating the function of the distribution ratio control unit 13 according to the third embodiment. Among the functions illustrated in the block diagram, a target steered angle switching computation unit 137 and an offset processing unit 138 are characteristic functions of the third embodiment, and the other functions are the same as those according to the second embodiment. The target steered angle switching computation unit 137 and the offset processing unit 138 are implemented when the programs stored in the memory 10b of the steering operation control device 10 are executed by the processor 10a. The function of the distribution ratio control unit 13 according to the third embodiment will be described below.

The driver target steered angle and the post-distribution target steered angle output from the post-distribution target steered angle computation unit 135 are input to the target steered angle switching computation unit 137. In addition, steering torque is input to the target steered angle switching computation unit 137 as reference information. The target steered angle switching computation unit 137 outputs the post-distribution target steered angle before steering torque exceeds the switching threshold. When steering torque has reached the switching threshold, it is determined that steering of the vehicle is completely switched to steering by the driver, and a driver steering determination flag is turned on. When the driver steering determination flag is turned on, the target steered angle switching computation unit 137 varies the output value from the post-distribution target steered angle to the driver target steered angle. Consequently, the final target steered angle is varied to the driver target steered angle fast, irrespective of the upper limit for the amount of increase per time in the distribution ratio used by the variation amount guard unit 136.

The behavior of the vehicle may be varied abruptly because of abrupt variations in the target steered angle when the driver target steered angle is significantly offset from the post-distribution target steered angle at the time when the driver steering determination flag is turned on. Thus, the offset processing unit 138 performs an offset process, such as that indicated in FIG. 11, for an output value of the target steered angle switching computation unit 137.

Figure 11:
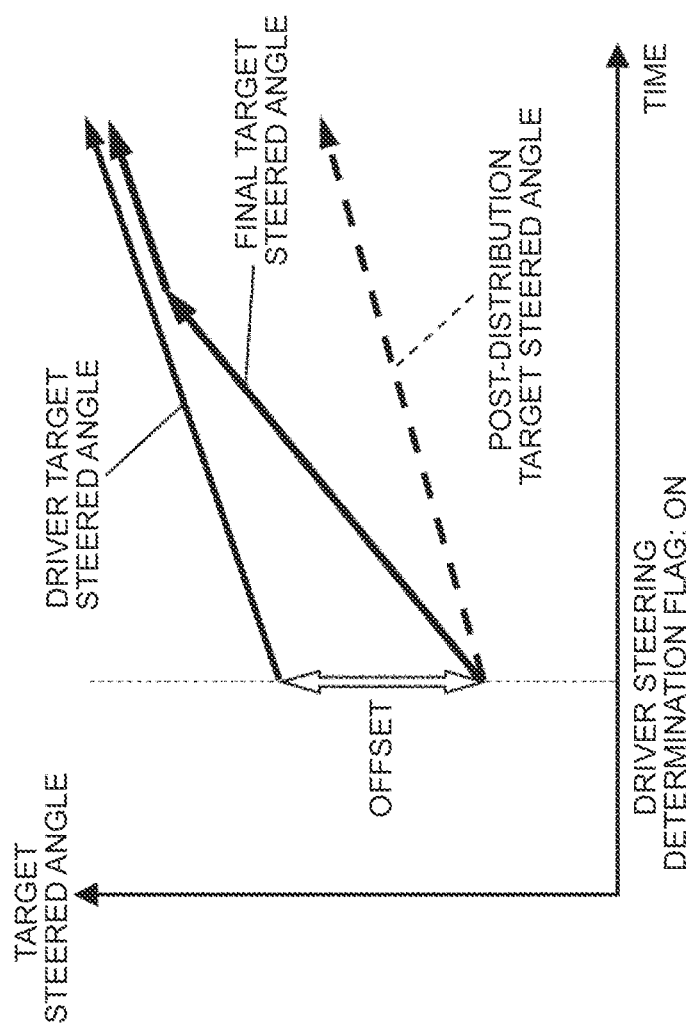
FIG. 11 illustrates an image of time-series variations in the final target steered angle caused by a distribution ratio control unit illustrated in FIG. 10.

FIG. 11 illustrates an image of time-series variations in the final target steered angle caused by the offset process. The post-distribution target steered angle is input from the target steered angle switching computation unit 137 to the offset processing unit 138 before the driver steering determination flag is turned on. At the time when the driver steering determination flag is turned on, the target steered angle input from the target steered angle switching computation unit 137 to the offset processing unit 138 is switched to the driver target steered angle.

In the offset process performed by the offset processing unit 138, the final target steered angle is gradually varied from the post-distribution target steered angle at the time when the driver steering determination flag is turned on to the driver target steered angle. At this time, the offset processing unit 138 limits the amount of variation per time in the final target steered angle such that the amount of variation per time in lateral acceleration generated by varying the final target steered angle is constant. Consequently, abrupt variations in the behavior of the vehicle can be suppressed.

Next, another embodiment of the present disclosure will be described. The variation amount guard unit 136 according to the second embodiment and the third embodiment may be replaced with a low-pass filter. Specifically, a low-pass filter with a variable cut-off frequency or two low-pass filters with different cut-off frequencies are provided after the distribution ratio computation unit 131. With such a configuration, fast variations in the distribution ratio are allowed by increasing the cut-off frequency of the low-pass filter when steering torque is increased. Meanwhile, abrupt variations in the distribution ratio are allowed by lowering the cut-off frequency of the low-pass filter when steering torque is lowered.

What is claimed is:

1. A steering system comprising:
   a steering operation mechanism having a first actuator, the steering operation mechanism mechanically decoupled from a steering wheel and configured to steer steered wheels using the first actuator;
   a second actuator configured to rotate the steering wheel via a steering shaft;
   a steering angle sensor configured to detect a steering angle of the steering wheel;
   a steering torque sensor configured to detect steering torque that acts on the steering shaft; and
   an electronic control unit configured to:
      control a steered angle using a steered angle command value to be provided to the first actuator,
      execute a first process, a second process, a third process, a fourth process, a fifth process, and a sixth process,
         the first process being a process of receiving a first target steered angle for drive assist from outside the electronic control unit,
         the second process being a process of driving the second actuator in accordance with a steering angle command value obtained by converting the first target steered angle into a steering angle, the third process being a process of computing a second target steered angle obtained by converting an actual steering angle detected by the steering angle sensor into a steered angle, the fourth process being a process of reflecting only the first target steered angle in a final target steered angle in response to a magnitude of actual steering torque detected by the steering torque sensor being equal to or less than a threshold, and reflecting at least the second target steered angle in the final target steered angle in response to the magnitude of the actual steering torque being more than the threshold, the fifth process being a process of determining the steered angle command value based on the final target steered angle, and the sixth process being a process of varying a magnitude of the threshold in accordance with whether a steered wheel operation by the drive assist is below a predetermined threshold value or is at or above the predetermined threshold value;

raise a rate of reflection of the second target steered angle in the final target steered angle as the magnitude of the actual steering torque is increased, and lower the rate of reflection as the magnitude of the actual steering torque is decreased, in response to the magnitude of the actual steering torque being more than the threshold; and provide an upper limit for an amount of variation per time in a distribution ratio as the rate of reflection of a driver target steered angle in the final target steered angle, the distribution ratio being a ratio of distribution between a drive assist target steered angle and the driver target steered angle in the final target steered angle.

2. The steering system according to claim 1, wherein the electronic control unit is configured to vary the magnitude of the threshold in accordance with a mode of the drive assist.

3. A control method for a steering system including a steering operation mechanism having a first actuator, the steering operation mechanism mechanically decoupled from a steering wheel and configured to steer steered wheels using the first actuator, a second actuator configured to rotate the steering wheel via a steering shaft, a steering angle sensor configured to detect a steering angle of the steering wheel, a steering torque sensor configured to detect steering torque that acts on the steering shaft, and an electronic control unit configured to control a steered angle using a steered angle command value to be provided to the first actuator, the control method comprising:

receiving a first target steered angle for drive assist from outside the steering operation control device;

driving the second actuator in accordance with a steering angle command value obtained by converting the first target steered angle into a steering angle;

computing a second target steered angle obtained by converting an actual steering angle detected by the steering angle sensor into a steered angle;

reflecting only the first target steered angle in a final target steered angle in response to a magnitude of actual steering torque detected by the steering torque sensor being equal to or less than a threshold, and reflecting at least the second target steered angle in the final target steered angle in response to the magnitude of the actual steering torque being more than the threshold;

determining the steered angle command value based on the final target steered angle;

varying a magnitude of the threshold in accordance with whether a steered wheel operation by the drive assist is below a predetermined threshold value or is at or above the predetermined threshold value;

raising a rate of reflection of the second target steered angle in the final target steered angle as the magnitude of the actual steering torque is increased, and lowering the rate of reflection as the magnitude of the actual steering torque is decreased, in response to the magnitude of the actual steering torque being more than the threshold; and providing an upper limit for an amount of variation per time in a distribution ratio as the rate of reflection of a driver target steered angle in the final target steered angle, the distribution ratio being a ratio of distribution between a drive assist target steered angle and the driver target steered angle in the final target steered angle.

* * * * *